(12) United States Patent
Ishimoto (10) Patent No.: US 7,826,317 B2
(45) Date of Patent: Nov. 2, 2010

(54) OPTICAL PICKUP DEVICE, OPTICAL RECORDING/REPRODUCING APPARATUS AND GAP-CONTROL METHOD

(75) Inventor: Tsutomu Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 12/197,581

(22) Filed: Aug. 25, 2008

(65) Prior Publication Data

US 2009/0067302 A1    Mar. 12, 2009

(30) Foreign Application Priority Data

Sep. 12, 2007   (JP) ............................ 2007-237136

(51) Int. Cl.
G11B 7/00 (2006.01)
(52) U.S. Cl. ............. 369/44.32; 369/59.19; 369/112.23
(58) Field of Classification Search ............. 369/44.32, 369/44.23, 44.43, 53.19, 123.23, 13.33
See application file for complete search history.

(56) References Cited

U.S. PATENT DOCUMENTS

| | | | | |
|---|---|---|---|---|
| 2005/0180283 A1* | 8/2005 | Ishimoto et al. | .......... | 369/53.19 |
| 2005/0190666 A1* | 9/2005 | Ishimoto | .................. | 369/44.25 |
| 2005/0259530 A1* | 11/2005 | Ishimoto et al. | .......... | 369/44.32 |
| 2006/0062110 A1* | 3/2006 | Kikukawa et al. | .......... | 369/47.1 |
| 2006/0133231 A1* | 6/2006 | Seo et al. | .................. | 369/44.23 |
| 2006/0280063 A1* | 12/2006 | Ishimoto | .................. | 369/44.34 |
| 2007/0171778 A1* | 7/2007 | Saito et al. | ................ | 369/44.23 |
| 2008/0037380 A1* | 2/2008 | Ishimoto | ................. | 369/112.23 |
| 2008/0198728 A1* | 8/2008 | Watanabe | .............. | 369/112.23 |
| 2008/0212436 A1* | 9/2008 | Zijp et al. | ................. | 369/53.19 |
| 2008/0239890 A1* | 10/2008 | Asai | ......................... | 369/44.23 |
| 2009/0003184 A1* | 1/2009 | Seo et al. | ................ | 369/112.23 |

* cited by examiner

*Primary Examiner*—Thang V Tran
(74) *Attorney, Agent, or Firm*—Oblon, Spivak, McClelland, Maier & Neustadt, L.L.P.

(57) ABSTRACT

An optical pickup device is provided. The optical pickup device includes a light source, a focusing optical system configured to irradiate an optical recording medium with near-field light, a light-detecting unit configured to detect a total-reflection return-light quantity from the optical recording medium, a control unit configured to generate a control signal in response to a detection signal supplied from the light-detecting unit, and a drive unit configured to drive the focusing optical system to a predetermined position above the optical recording medium. The control unit feeds forward a push-pull signal in a traveling direction of the drive unit relative to the optical recording medium to a gap-error signal supplied from the light-detecting unit to generate a gap-servo signal. The control unit includes a repetitive controller storing a predetermined number of the push-pull signals.

9 Claims, 12 Drawing Sheets

ONE ROTATION

$$Tpp = (A+D) - (B+C)$$

$$Rpp = (A+B) - (C+D)$$

OPTICAL PICKUP DEVICE, OPTICAL RECORDING/REPRODUCING APPARATUS AND GAP-CONTROL METHOD

CROSS REFERENCES TO RELATED APPLICATIONS

The present invention contains subject matter related to Japanese Patent Application JP 2007-237136 filed in the Japanese Patent Office on Sep. 12, 2007, the entire contents of which being incorporated herein by reference.

BACKGROUND OF THE INVENTION

1. Field of the Invention

The present invention relates to an optical pickup device that uses an near-field light to record data to and/or reproduce data from an optical recording medium, an optical recording/reproducing apparatus including such an optical pickup device, and a gap-control method used in such an optical pickup device.

2. Description of the Related Art

In recent years, for attaining high recording density and high resolution in optical recording media such as optical disks and optical memory cards, a recording/reproducing system using near-field light (also called evanesent wave) generated at an interface between substances when the distance between them is shorter than a certain distance has been used. In such a recording/reproducing system using near-field light, a gap between a device applying near-field light, such as a lens, and the surface of an optical recording medium may need to be within an extremely small range of typically about ½ to ⅕ of the wavelength of light to be used in recording and reproducing process.

A focusing optical system that generates near-field light may include an objective lens with a high numerical aperture, such as an aspheric lens, and a solid immersion lens (SIL) between the objective lens and an optical recording medium. Such a system using the SIL may need to keep the distance (gap) between the SIL and the surface of the optical recording medium, such as an optical disk, at a distance allowing the generation of near-field light, about ½ to ⅕ or less of the wavelength of light as described above. In this case, furthermore, the posture of the SIL should be controlled to follow the wobbling of the surface of the optical recording medium or disk-wobbling of the disk-shaped optical recording medium. In order to control the posture of the SIL, for example, a gap-control method for keeping a desired gap constant by detecting the gap based on a total-reflection return-light quantity has been proposed (see, for example, Japanese Unexamined Patent Application Publication No. 2001-76358).

This control method utilizes the fact that the size of the gap and the total-reflection return-light quantity are in a proportional relationship at a distance that allows the generation of near-field light. In other words, in the method, the total-reflection return-light quantity is used to have a gap-error signal. Also, a feedback-servo loop is formed by stabilizing a servo loop system with a phase compensation filter to hold the gap constant.

For example, 20 nm is selected as a desired value for keeping a distance allowing the generation of near-field light, 5 nm is an allowable deviation, and 40 μm is an allowable surface-wobbling level. Here, a disk-shaped optical recording medium is used and the rotational speed thereof is set to 3,000 rpm (revolutions per minute). In this case, the necessary bandwidth may be 8 kHz or more. In actual, however, disturbance caused by the rotation of the disk strongly outputs a rotationally synchronized component, so that it is difficult to control the gap with high accuracy even if a bandwidth of 8 kHz or more is ensured.

SUMMARY OF THE INVENTION

There is an idea of using a push-pull signal in a traveling direction of an optical system relative to an optical recording medium, specifically, in a tangential direction relative to a disk-shaped optical recording medium to compensate a disturbance component of a gap-error signal by carrying out feed-forward control with the push-pull signal.

A tangential push-pull signal is also used as a control signal in a tilt servo control. In this case, a gap control and a tilt control may be incompatible with each other.

Accordingly, it is desirable to allow a tilt control to be carried out in addition to the control of a gap between a focusing optical system and an optical recording medium with high accuracy when the optical recording medium is irradiated with near-field light.

According to an embodiment of the present invention, there is provided an optical pickup device including a light source, a focusing optical system, a light-detecting unit, a control unit, and a drive unit. The focusing optical system is configured to irradiate an optical recording medium with near-field light. The light-detecting unit is configured to detect a total-reflection return-light quantity from the optical recording medium. The control unit is configured to generate a control signal in response to a detection signal supplied from the light-detecting unit. The drive unit is configured to drive the focusing optical system to a predetermined position above the optical recording medium. The control unit feeds forward a push-pull signal in a traveling direction of the drive unit relative to the optical recording medium to a gap-error signal supplied from the light-detecting unit to generate a gap-servo signal. Furthermore, the control unit includes a repetitive controller storing a predetermined number of the push-pull signals.

According to an embodiment of the present invention, there is provided an optical recording/reproducing apparatus including an optical pickup device, a mounting unit on which an optical recording medium is attached and a second drive unit configured to move the mounting unit relative to a focusing optical system. The optical pickup device includes a light source, the focusing optical system, a light-detecting unit, a control unit, and a first drive unit. The focusing optical system is configured to irradiate an optical recording medium with near-field light. The light-detecting unit is configured to detect a total-reflection return-light quantity from the optical recording medium. The control unit is configured to generate a control signal in response to a detection signal supplied from the light-detecting unit. The first drive unit is configured to drive the focusing optical system to a predetermined position above the optical recording medium. The control unit feeds forward a push-pull signal in a traveling direction of the first drive unit relative to the optical recording medium to a gap-error signal supplied from the light-detecting unit to generate a gap-servo signal. The control unit includes a repetitive controller storing a predetermined number of the push-pull signals.

According to an embodiment of the present invention, there is provided a gap-control method. The gap-control method includes the steps of:

detecting a total-reflection return-light quantity between an optical lens and an optical recording medium to obtain a gap-error signal;

feeding forward a push-pull signal of the total-reflection return-light quantity in a traveling direction of the lens relative to the optical recording medium to the gap-error signal to obtain a gap-servo signal;

carrying out a gap servo control using the gap-servo signal;

storing a predetermined number of the push-pull signals; and carrying out a tilt servo control after storing the push-pull signals.

As described above, according to an embodiment of the present invention, a push-pull signal in a traveling direction of a drive unit relative to an optical recording medium or in a tangential direction perpendicular to a radial direction of a disk-shaped optical recording medium is fed forward to generate a gap-servo signal for controlling a gap between a focusing optical system irradiating an optical recording medium with near-field light and the optical recording medium. Thus, it is possible to reduce residual errors in a gap servo system by operating a gap-servo signal and obtain the same effect as in a repetitive servo system. As later described, a push-pull signal in a traveling direction of the drive unit relative to an optical recording medium or a push-pull signal in a tangential direction relative to a disk-shaped optical recording medium has a similar phase to a gap-error signal.

However, in the case of simply feeding forward a tangential push-pull signal as described above, a tangential tilt-error signal may become zero when a tilt servo control is carried out with the tangential push-pull signal. As a result, a feed-forward signal may disappear. As a result, gap servo control may be affected by a tilt servo control.

In contrast, according to an embodiment of the present invention, a feed-forward servo control is initiated using a push-pull signal in a traveling direction of the drive unit relative to an optical recording medium or a tangential push-pull signal for a disk-shaped optical recording medium. Subsequently, a repetitive controller stores a predetermined number of the push-pull signals. In other words, in the case of the disk-shaped optical recording medium, the number of the push-pull signals for one rotation is stored and subsequently a tangential tilt servo control is carried out. Therefore, a feed-forward servo control with the tangential push-pull signal is compatible with the tilt servo control.

According to an embodiment of the present invention, when an optical recording medium is irradiated with near-field light, the gap between the focusing optical system and the optical recording medium can be controlled with high accuracy while being compatible with a tilt control.

BRIEF DESCRIPTION OF THE DRAWINGS

FIGS. 2A and 2B are schematic diagrams illustrating a relationship of a total-reflection return-light quantity to a gap between an optical recording medium and a focusing optical system in an optical pickup device using near-field light, wherein

FIGS. 7A to 7C are schematic diagrams illustrating the tilt of SIL to an optical recording medium, wherein

FIGS. 13A and 13B are graphic diagrams illustrating waveforms of a gap-error signal and a tangential push-pull signal, wherein

DESCRIPTION OF THE PREFERRED EMBODIMENTS

Hereinafter, embodiments of the invention will be described in detail. It should be understood that the invention is not limited thereto.

Figure 1:
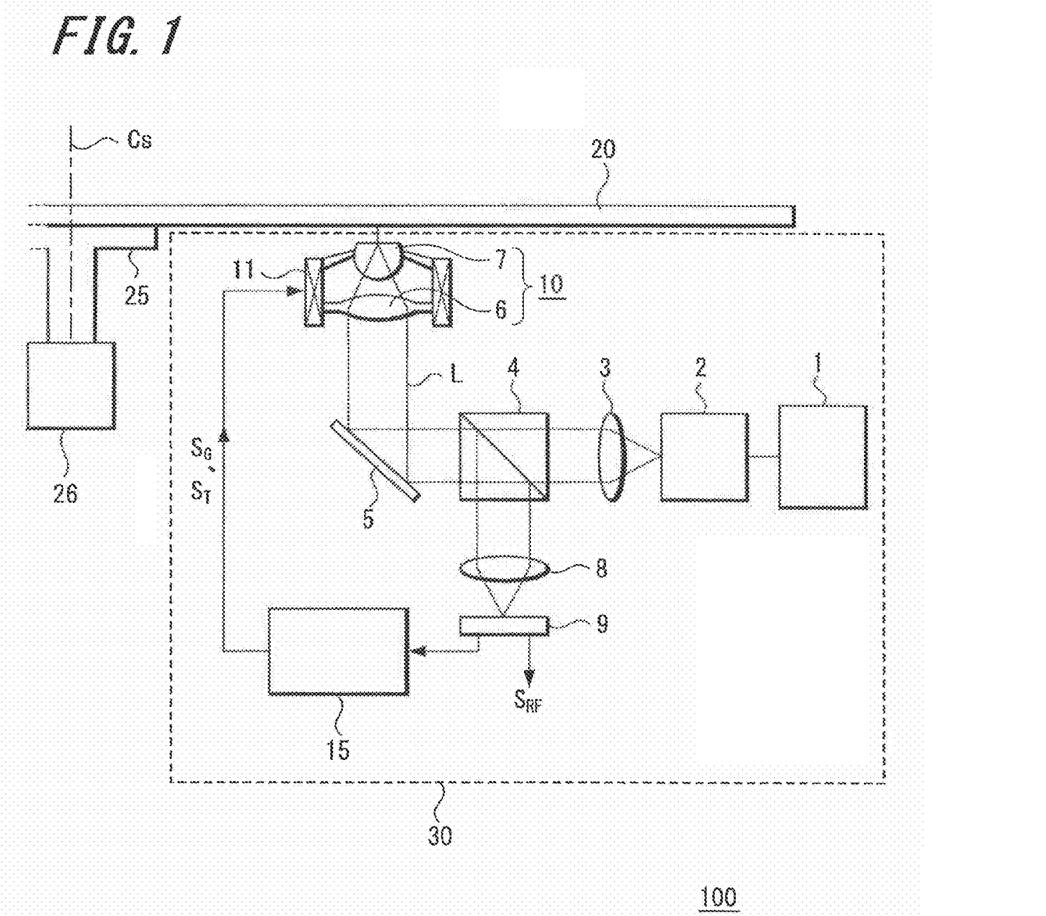
FIG. 1 is a schematic diagram illustrating an optical recording/reproducing apparatus including an optical pickup device in accordance with an embodiment of the present invention.

FIG. 1 is a schematic diagram of an optical recording/reproducing apparatus 100 having an optical pickup device 30 in accordance with an embodiment of the present invention. In this example, the optical recording/reproducing apparatus 100 includes an optical lens 6 and a solid immersion lens (SIL) 7. Here the optical lens 6 is an objective lens formed of an aspheric lens or the like. Also, the SIL 7 may be a hemispherical or super-hemispherical lens. In FIG. 1, the super-hemispherical SIL is represented. Alternatively, it may be a hemispherical SIL. The optical pickup device 30 includes a power-control unit 1, a light source 2 such as a laser diode, a collimator lens 3, a beam splitter 4, a mirror 5, a focusing optical system 10 having the optical lens 6 and the SIL7, a focusing lens 8 arranged on a branched optical path by the beam splitter 4, and a light-detecting unit 9 including a four-segment photodiode or the like. The optical pickup device 30 further includes a control unit 15 carrying out an operation of a detection signal supplied from the light-detecting unit 9 to generate a gap-error signal $S_G$. Here, the gap-error signal $S_G$ is a control signal for controlling a drive unit 11 of the focusing optical system 10. The control unit 15 may be configured to generate a tilt-error signal $S_T$ that is a control signal for controlling the tilt of the SIL 7 to an optical recording medium 20 and output the tilt-error signal $S_T$ to the drive unit 11.

The optical recording/reproducing apparatus 100 further includes a mounting unit 25 for mounting a disk-shaped optical recording medium 20 or the like and a drive unit 26 for rotationally driving the mounting unit 25 about a rotational axis, for example, one represented by a dashed line Cs as shown in FIG. 1.

In the above-described configuration, light output from the light source 2 is made into parallel light by the collimator lens 3 and then passes through the beam splitter 4. Subsequently, the light is reflected by the mirror 5 and then incident on the focusing optical system 10. The power-control unit 1 controls the output from the light source 2 in response to recording data supplied from an data storage unit (not shown) when recording such data or the like. The output control by the power-control unit 1 may be unnecessary when reproducing such data and the output from the light source 2 may be constant. Subsequently, a data recording surface of the optical recording medium 20 is irradiated with near-field light that is the light through the focusing optical system 10. Return light reflected from the optical recording medium 20 is further reflected by the mirror 5 and the beam splitter 4, and then focused onto the light-detecting unit 9 through the focusing lens 8.

Part of the light detected by the light-detecting unit 9 can be output as a radio-frequency (RF) signal $S_{RF}$ corresponding to the data recorded on the optical recording medium 20 at the time of reproduction. On the other hand, a total-reflection return-light quantity is input into the control unit 15 that generates a signal for controlling the drive unit 11 driving the focusing optical system 10. The control unit 15 outputs a gap control signal $S_G$ generated by the later-described feed-forward control and a tilt control signal $S_T$ to the drive unit 11. Here the drive unit 11 may be, for example, formed of a biaxial actuator or a triaxial actuator with a voice coil motor. Alternatively, a drive unit for gap control and a drive unit for tilt control may be separately provided to allow control signals to be input into the respective drive units. Furthermore, in addition to the structural components represented in FIG. 1, various optical elements such as those for aberration correction may be additionally arranged on the optical pickup device 30.

In the optical recording/reproducing apparatus 100, as described above, the optical recording medium 20 is mounted on the mounting unit 25 rotationally driven by the drive unit 26 and the optical pickup device 30 is mounted on, for example, a horizontal moving mechanism (not shown) which moves the optical pickup device 30 in parallel along the recording surface of the optical recording medium 20. The horizontal moving mechanism can work with the drive unit 26 so that a recording track on the surface of the optical recording medium 20 is scanned, for example, spirally or concentrically with the near-field light applied from the focusing optical system 10.

Figure 2A:
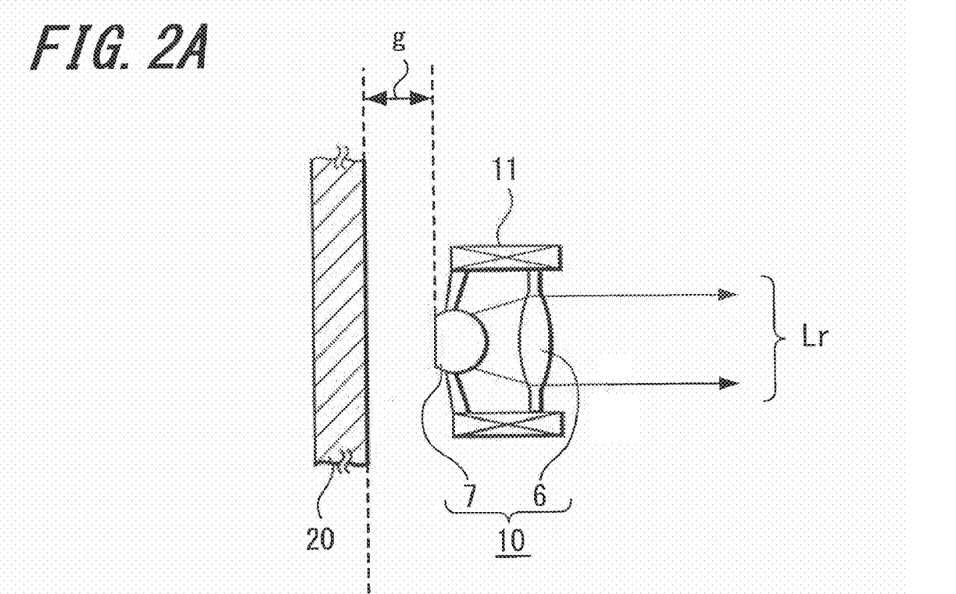
FIG. 2A is a schematic view of the gap and FIG. 2B is a graphic view of the relationship of the total-reflection return-light quantity to the gap.
Figure 2B:
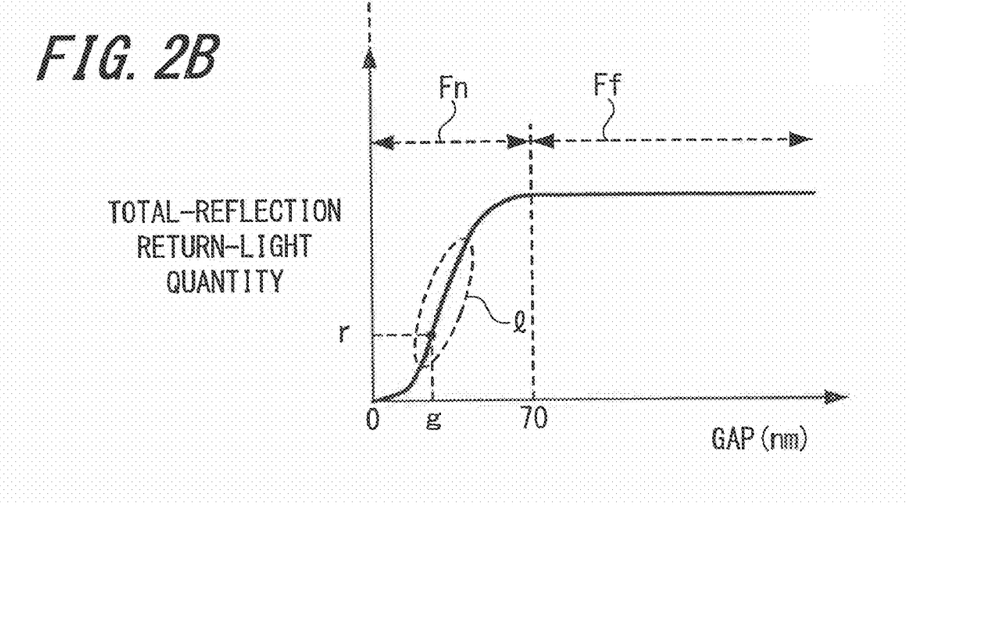

FIGS. 2A and 2B are schematic diagrams illustrating the relationship of the total-reflection return-light quantity to the gap between the recording medium 20 and the focusing optical system 10 in the optical pickup device 30 using near-field light. FIG. 2A is a schematic view showing the gap g between the end surface of the SIL 7 of the focusing optical system 10 including the optical lens 6 and SIL 7, and the optical recording medium 20. FIG. 2B is a graphic view showing the relationship between the total-reflection return-light quantity and the gap g. In this case, the total-reflection return-light quantity is the amount of light (component with a numerical aperture of $\geq 1$) incident at an angle of total reflection on the end surface of the SIL 7 facing the optical recording medium 20.

As shown in FIG. 2B, a gap ½ to ⅕ or more of the wavelength of the incident laser light corresponds to a far-field region Ff, which is not a near-field region. In the far-field region Ff, light is completely reflected on the end surface of the SIL 7, so that the total-reflection return-light quantity can be held constant. On the other hand, in general, the gap ½ to ⅕ or less of the wavelength of the incident laser light is in a near-field state, or corresponds to a near-field region Fn. FIG. 2B illustrates an example in which the total-reflection return-light quantity is reduced when the gap is 70 nm or less in the case where an incident-light wavelength is 405 nm. The relationship between the gap in the near-field region and the wavelength of the incident light is not constant and varies from about ½ to ⅕ of the wavelength of the incident laser light depending on the wavelength thereof, the materials and configurations of the optical recording medium 20 and the SIL 7, and so on.

In the near-field region Fn, an evanescent coupling occurs between the end surface of the SIL 7 and the surface of the optical recording medium 20. As a result, part of the total-reflection return light passes through the end surface of the SIL 7 toward the optical recording medium 20, leading to a decrease in total-reflection return-light quantity. Furthermore, when the SIL 7 completely touches the optical recording medium 20, the total-reflection return light completely passes through the SIL 7 toward the optical recording medium 20. As a result, a total-reflection return-light quantity becomes zero. Therefore, as is illustrarted in FIG. 2B, the relationship of the gap between the end surface of the SIL 7 and the optical recording medium 20 to the total-reflection return-light quantity is represented by a gradual decrease in total-reflection return-light quantity in the near-field region Fn. Besides, the total-reflection return-light quantity becomes zero in the absence of the gap even though it was held constant in the far-field region Ff. Furthermore, the region where the total-reflection return-light quantity can be decreased includes a region that allows the relation of the gap to the total-reflection return-light quantity to show a linear behavior as represented by one surrounded by the dashed line 1. Therefore, in the linear-behavior region, it is possible to hold the gap constant by forming a feedback loop using the total-reflection return-light quantity for determining a gap error. In other word, when the gap to be obtained is represented by "g" in FIG. 2B, the control may be carried out so that the total-reflection return-light quantity can be adjusted to "r".

Figure 3:
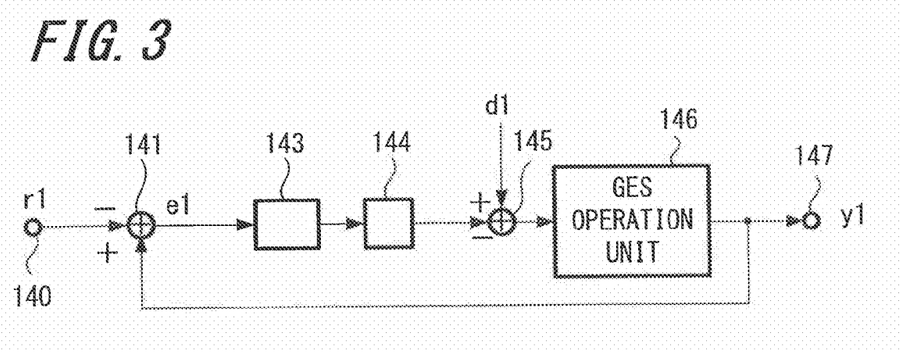
FIG. 3 is a block diagram illustrating a configuration of a servo loop according to a comparative example.

FIG. 3 is a block diagram illustrating a configuration of a servo loop according to a comparative example when the gap control is performed using a typical feedback loop. In this case, the servo loop includes: a subtractor 141; a servo filter 143 formed of a phase compensation filter, a lead-lag filter, or the like; a control target 144; an adder 145; and a GES operation unit 146. In FIG. 3, "r1" denotes a desired gap signal (the desired value of total-reflection return-light quantity shown in FIG. 2B); "d1" is a disturbance caused by the wobbling of the disk surface; "e1" is the difference between the desired value and a gap-error signal (GES) and represented by the expression: e1=y1−r1. The control target 144 is an actuator on which the SIL 7 is mounted, or the drive unit 11 shown in FIG. 1. The GES operation unit 146 includes the light-detecting unit 9 as shown in FIG. 1, an analog/digital convertor, an amplifier, and so on.

The desired gap signal r1 input from an input terminal 140 is supplied to the subtractor 141 together with a detection signal y1 output from the GES operation unit 146 as later described, thereby e1 (=y1−r1) being output. The signal e1 processed through the servo filter 143 is input to the control target 144. The adder 145 adds the disturbance d1 to a detection signal after the displacement of the control target 144 to allow the GES operation unit 146 to output a gap-error signal GES (i.e., y1).

In this case, as shown in FIG. 3, feedback of y1 (the gap-error signal (GES)) is carried out.

Figure 4:
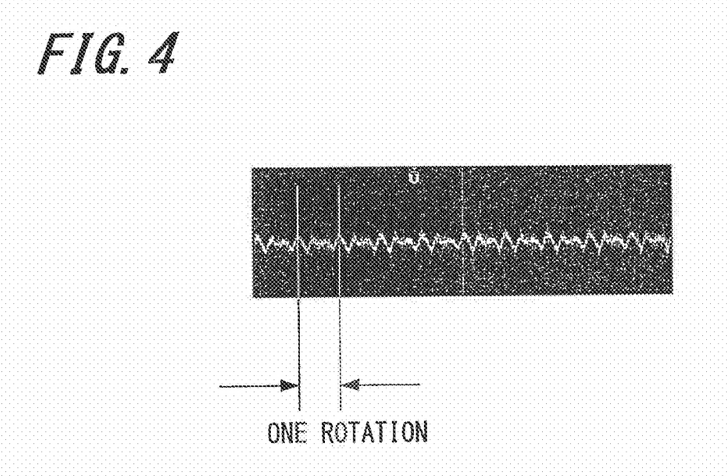
FIG. 4 is a graphic diagram illustrating a waveform of a gap-error signal obtained in a comparative example.

However, in the case of adjusting the gap by the feedback of GES as described above, it becomes difficult to follow the surface-wobbling of the optical recording medium when the rotational speed of the optical recording medium increases (i.e., the speed that the control target 144 moves relative to the optical recording medium increases). Thus, as shown in FIG. 4, the residual error of a rotational component is overlapped on GES. In FIG. 4, a portion of the waveform indicated by the arrows corresponds to GES for one rotation. The component synchronized with the rotation, which is a residual error, is shown in FIG. 4.

According to an embodiment of the present invention, it is possible to reduce the residual error that is the component synchronized with the rotation. In the following description, the gap adjusting control according to an embodiment of the present invention will be described.

Figure 5:
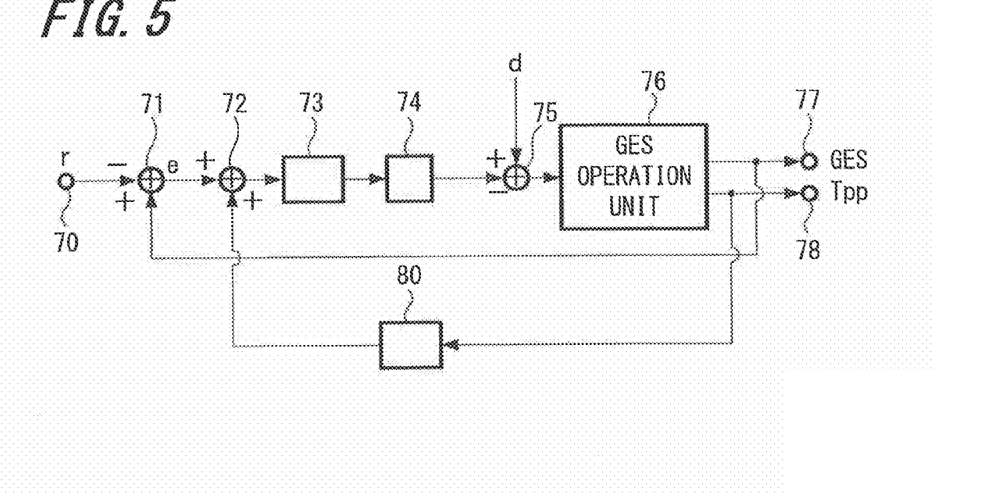
FIG. 5 is a block diagram illustrating a configuration of a servo loop of a control unit of an optical pickup device according to a reference example.

FIG. 5 is a block diagram illustrating the configuration of a servo loop in the control unit of the optical pickup device according to a reference example of an embodiment of the invention. In this case, as shown in FIG. 5, the servo loop includes a subtractor 71, an adder 72, a servo filter 73 in a main loop, a control target 74, an adder 75, a GES operation unit 76, and a servo filter 80 for a feed-forward signal. A low-pass filter or the like can be used as the servo filter 80.

A desired value "r" input from an input terminal 70 is supplied to the subtractor 71 and the adder 72, followed by entering the control target 74, in this case, the drive unit 11 shown in FIG. 1, through the servo filter 73. The adder 75 adds the disturbance "d" to an output being varied with the displacement of the control target 74. Subsequently, the GES operation unit 76 detects a total-reflection return-light quantity.

Figure 6:
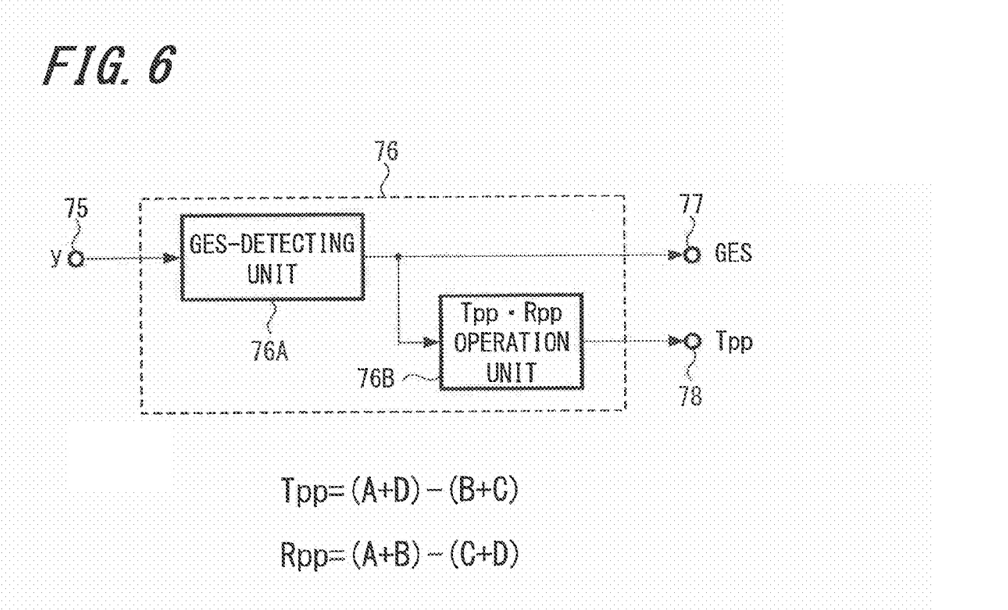
FIG. 6 is a block diagram illustrating an example of a GES operation unit of the control unit shown in FIG. 5.

FIG. 6 is a block diagram illustrating an example of the configuration of the GES operation unit 76 shown in FIG. 5. The GES operation unit 76 includes a GES-detection unit 76A and a Tpp/Rpp operation unit 76B. The GES-detection unit 76A detects a total-reflection return-light quantity from the end surface of the SIL 7 in the focusing optical system 10 as shown in FIG. 1. In other words, in the GES-detection unit 76A, quadrant detectors detect four divided quantities of total-reflection return light in a traveling direction of the control target 74 relative to an optical recording medium and the direction perpendicular thereto, or in a tangential direction and a radial direction in the case of a disk-shaped optical recording medium. The total quantity of total-reflection return light is output as GES (y) from an output terminal 77 and the GES (y) is also input to the subtractor 71 for the feedback.

On the other hand, based on the divided light quantities, a push-pull signal in a traveling direction of the control target 74 relative to the optical recording medium, a tangential push-pull signal Tpp in this case, is operated and output. In addition, a push-pull signal Rpp in the radial direction may be operated from the same four divided quantities of total reflection return light.

The resulting Tpp is output from an output terminal 78. The resulting Tpp is also added to the adder 72 through the servo filter 80. Thus, Tpp feed-forward configuration is provided.

Figure 7A:
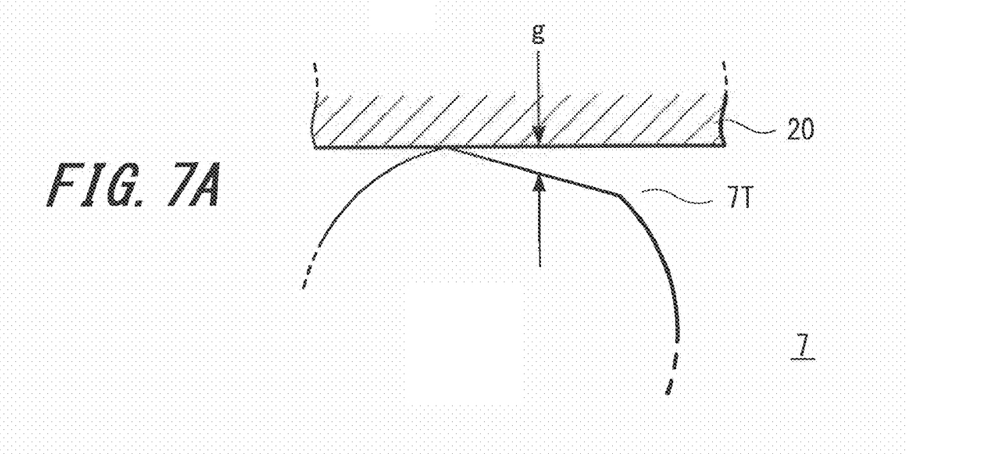
FIG. 7A is a cross-sectional view of SIL and the optical recording medium.
Figure 7B:
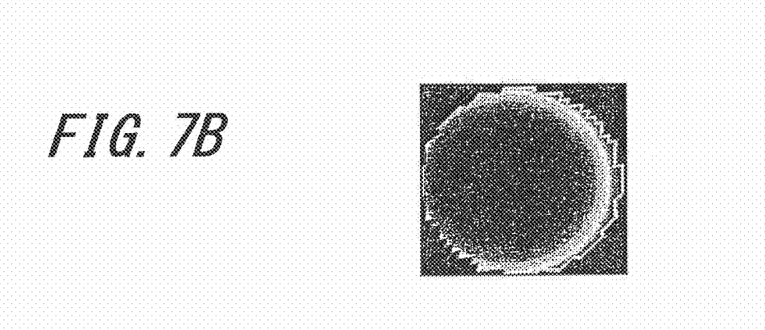
FIG. 7B is a diagram showing an example of a total-reflection return-light quantity.
Figure 7C:
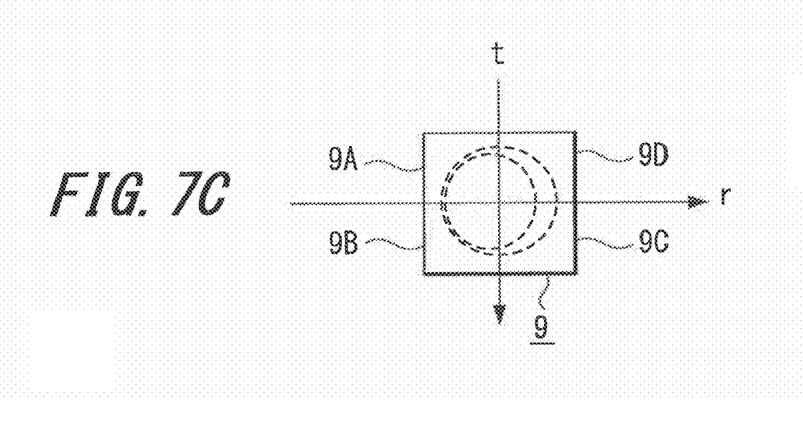
FIG. 7C is a schematic diagram of a light-detecting unit.

As shown in FIG. 7A, if the end surface 7T of the SIL 7 facing the optical recording medium 20 is tilted due to surface-wobbling or the like, the total-reflection return-light quantity can be detected as schematically represented by the bright and dark areas in FIG. 7B. Thus, the quantity of return light corresponding to the gap can be detected at the portion of the end surface 7T away from the surface of the optical recording medium 20, or the portion in a far-field region. As shown in FIG. 7C, the tangential direction is represented by the arrow "t" and the radial direction is represented by the arrow "r". The light-detecting unit 9 (see FIG. 1) has four light-detecting regions 9A, 9B, 9C, 9D divided in the tangential and radial directions. As indicated by the dashed lines in FIG. 7C, a difference in return light intensity (i.e., a difference in GES intensity) is caused in the tangential or radial direction when the SIL 7 has a tilt to the optical recording medium 20.

Here, if signals output from the regions 9A to 9D are represented by A to D respectively, then an error signal in the tangential direction, which is referred to as Tpp, and an error signal in the radial direction, which is referred to as Rpp, are defined as follows:

$$Tpp=(A+D)-(B+C) \tag{1}$$

$$Rpp=(A+B)-(C+D) \tag{2}$$

Since Tpp is calculated from a gap error, GES can be represented by the following expression (3) where $\alpha$ and $\beta$ respectively denote the degrees of the above tilts in the gap error in the tangential direction:

$$GES=A+D+B+C=(\alpha+\beta)\{D/(1+CP)\} \tag{3}$$

Here, $$\alpha+\beta=1 \tag{4}$$

Thus, the difference $(\alpha-\beta)$ of tilt degrees corresponds to a tilt angle. The above expression (3) can be induced from the following consideration.

The Laplace transforms of e, r, and d in FIG. 5 are represented by E, R, and D, respectively. Then, from FIG. 5, the following expressions can be obtained:

$$E=Y-R \tag{5}$$

$$-ECP+D=Y \tag{6}$$

where C and P represent the outputs of the servo filter 80 and the control target 74, respectively and CP represents the gain in the control unit.

If e is deleted from the above expressions (5) and (6) GES (i.e., Y) can be represented by the following expression (7):

$$Y=(CP \cdot R)/(1+CP)+D/(1+CP) \tag{7}$$

In the above expression (7), the second term is a disturbance term due to the disturbance d. Thus, for allowing GES to completely follow the desired value R, the disturbance term represented by the following expression (8) may be cancelled.

$$D/(1+CP) \tag{8}$$

In other words, in the first term in the above expression (7), the following expression (9), the desired value R is constant (i.e., a DC component).

$$(CP \cdot R)/(1+CP) \tag{9}$$

In general, the DC gain of CP in the case of a desired-value-following servo mechanism is sufficiently larger than 1 as expressed as follows:

$$1 \ll CP \tag{10}$$

Thus, the above expression (9) can be represented by the following expression (11):

$$\{CP/(1+CP)\} \cdot R \approx (CP/CR) \cdot R = R \tag{11}$$

In other words, the gap error (difference from the desired value) corresponds to the second term of the above expression (7). Thus, the gap-error signal GES can be represented by the following expression (12):

$$GES=D/(1+CP) \quad (12)$$

The push-pull signal Tpp is represented as one obtained by multiplying the tilt angle ($\alpha-\beta$) by the disturbance term in the above expression (8) and thus represented by the following expression (13):

$$Tpp=(\alpha-\beta)\cdot\{D/(1+CP)\}=(\alpha-\beta)\cdot GES \quad (13)$$

According to the above expression (13), since the push-pull signal Tpp is strongly influenced by GES, Tpp may be standardized by GES (divided by GES) or GES may be held constant.

When standardizing Tpp by eliminating the influence of GES, the tilt servo control can be performed correctly using Tpp. In this case, however, the accuracy of the gap servo control may not improve. Thus, it may be necessary to increase the accuracy of the gap servo control separately.

However, as long as GES is held constant in advance, the gap accuracy can be previously guaranteed and also held constant, GES=c (constant), in the above expression (13). In other words, it can be represented by the following expression (14):

$$Tpp=(\alpha-\beta)\cdot c \approx \alpha-\beta \quad (14)$$

Consequently, a tilt error can be accurately obtained without influence of GES.

Accordingly, in the embodiment of the present invention, a Tpp error is used for increasing the gap accuracy. In the followings, it is described that Tpp and GES are in phase.

First, if the servo mechanism follows the disturbance and GES is held constant, the condition represented by the above expression (14) is attained because of GES=c (constant). In this case, a feed forward may be unnecessary, because the GES is already small.

Next, if the servo mechanism may stop following the disturbance, the tilt angle is physically equivalent to the inclination of a surface-waggling signal D or the differentiation. Thus, the following expression can be obtained (15):

$$\alpha-\beta \approx s\cdot D \quad (15)$$

In addition, GES of the above equation (13) can be represented by the following equation (16):

$$D/(1+CP) \approx D/(K/s)=K'\cdot s\cdot D \quad (16)$$

In the above expressions (15) and (16), s denotes the Laplace operator that means differentiation. Also, K denotes a gain and K' denotes the inverse of K (K'=1/k).

Figure 8:
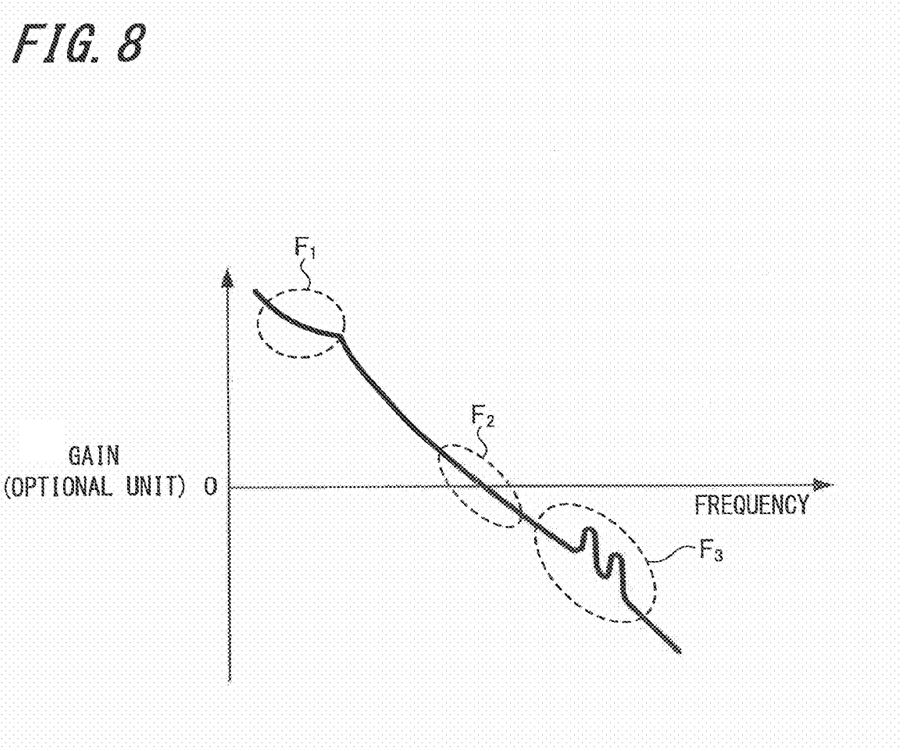
FIG. 8 is a Bode diagram of a transfer function with a control system in a typical optical pickup device.

In general, a Bode diagram illustrating the transfer function of an actuator in an optical pickup device is represented as shown in FIG. 8. In FIG. 8, the horizontal axis represents the frequency and the vertical axis represents the gain. The error ratio is in inverse proportion to the gain, so that the gain can be increased by boost in a comparatively low frequency region represented by the dashed line F1. In a frequency region represented by the dashed line F2, the slope of the curve may be steep and the gain may be unstable. Thus, it is compensated to have a gentle slope so as to be about −20 dB/dec. Furthermore in a high frequency region represented by the dashed line F3, secondary or tertiary resonance is generated. Thus, it turns out that such resonance may occur when the servo bandwidth is increased simply.

Particularly, an optical system with irradiation of near-field light has an extremely small distance to be controlled. Thus, it may be difficult to control such system when a remaining deviation $\Delta e$ for DC remains even if only slightly. Typically, an integrator is incorporated into the servo filter, so that the remaining deviation $\Delta e$ can be represented by the following expression (17):

$$\Delta e=D/K \quad (17)$$

Thus, K may be $\infty$ and $\Delta e$ may be 0 when the integrator is incorporated into the servo filter.

The above expression (16) is further described. The transfer function of CP in the rotation frequency band in which the servo mechanism may not follow the disturbance can be derived from the fact that it becomes almost integration 1/S. In other words, the gain is constant when the frequency is not higher than the primary resonance of an actuator that is a control target, or generally not higher than 100 Hz. On the other hand, the gain in the same frequency band of the servo filter is provided with the integrator 1/S to remove the residual error for DC as described above. Therefore, the following expression (18) can be provided:

$$1+CP \approx CP \approx K/S \quad (18)$$

Here, the above expression (15) represents a tilt error, so that it has a sign. The above expression (16) represents a gap error GES (total-reflection return-light quantity) to have a positive sign. Consequently, the sign of above equation (13) follows a tilt-error signal, and amplified amplitude will be observed. In other words, the servo mechanism follows the disturbance and the amplitude becomes large compared with the case that GES is constant.

However, considering the phase relationship between Tpp and GES from the above equations (15) and (16), the differentiation or the phase of each of them advances 90 degrees relative to the surface-wobbling signal D. Therefore, it is also ensured that both Tpp and GES are in phase.

Finally, the case that the servo mechanism may stop following the disturbance can be represented by the following expressions (19) and (20):

$$\alpha-\beta \approx s\cdot D \quad (19)$$

$$D/(1+CP) \approx D/1=D \quad (20)$$

The above expression (19) is similar to the above expression (15).

The above expression (20) can be derived because of a small gain, CP<<1, due to the fact that the servo mechanism may not follow the disturbance at all, or it stays in the high-frequency band in FIG. 8. Regarding the phase relationship, from the above expressions (19) and (20), Tpp and GES are in the same phase as that of the surface-wobbling signal D.

Figure 9:
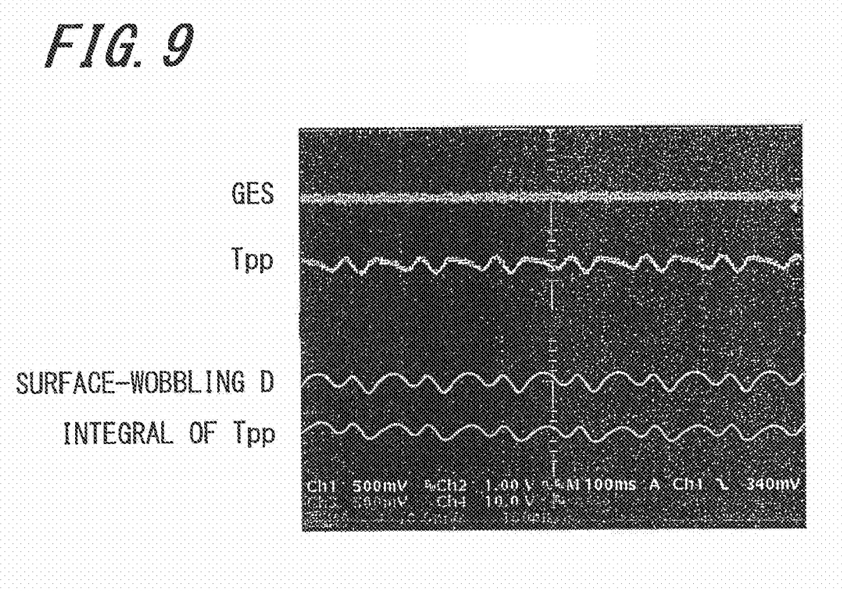
FIG. 9 is a graphic diagram illustrating a signal waveform when a gap follows surface-wobbling.
Figure 10:
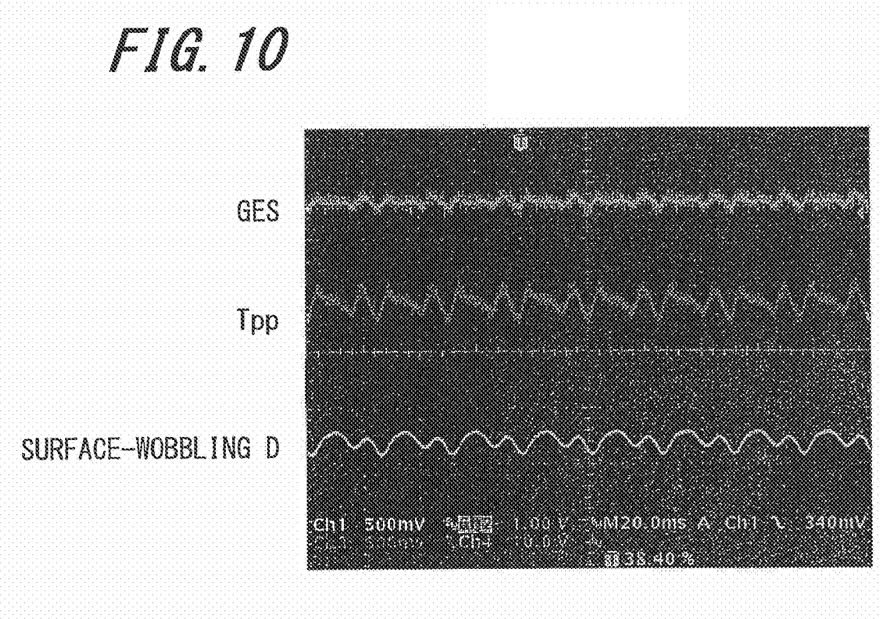
FIG. 10 is a graphic diagram illustrating a signal waveform when the gap tends to stop following the surface-wobbling.
Figure 11:
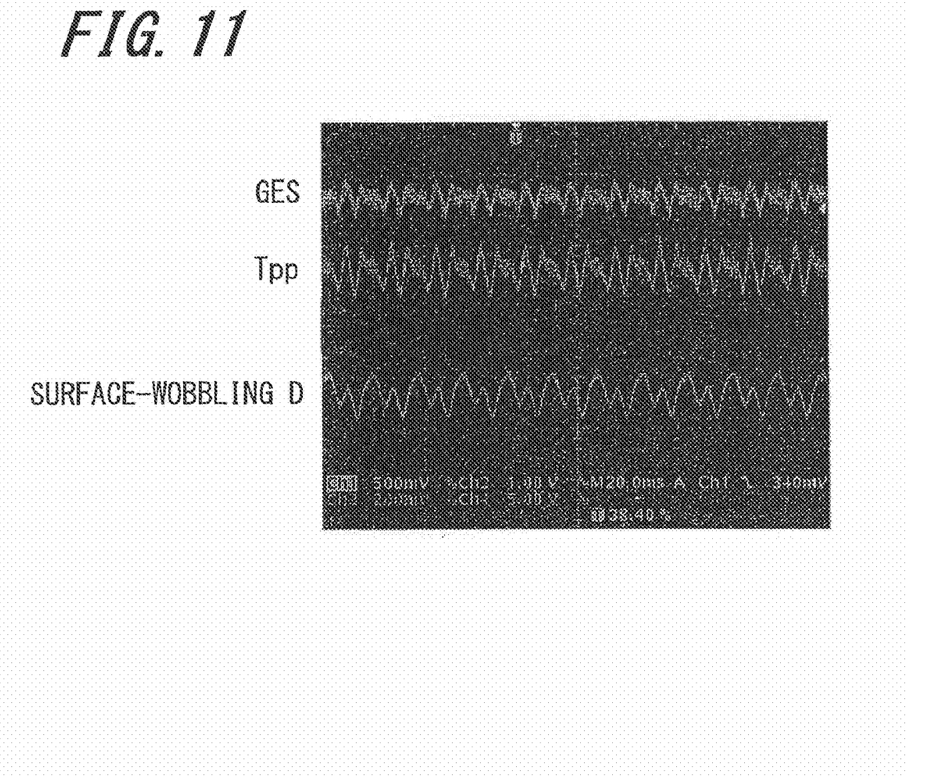
FIG. 11 is a graphic diagram illustrating a signal waveform when the gap may not follow the surface-wobbling.

The above result shows that Tpp and GES are in phase and serve as similar signals. FIGS. 9 to 11 show the waveforms of Tpp and GES. In each of them, the wavelength of light used is 405 nm, the numerical aperture NA of the focusing optical system is 1.84, and the desired value of the gap is 25 nm. FIG. 9 illustrates the case that the gap completely follows the surface-wobbling. FIG. 10 illustrates the case that the gap tends to stop following the surface-wobbling. FIG. 11 illustrates the case that the gap may not follow the surface-wobbling. Each of these figures represents GES, Tpp, and surface-wobbling D. FIG. 9 further represents the integration of Tpp. According to FIGS. 9 to 11, GES and Tpp are similar signals and correlative with each other.

Figure 12:
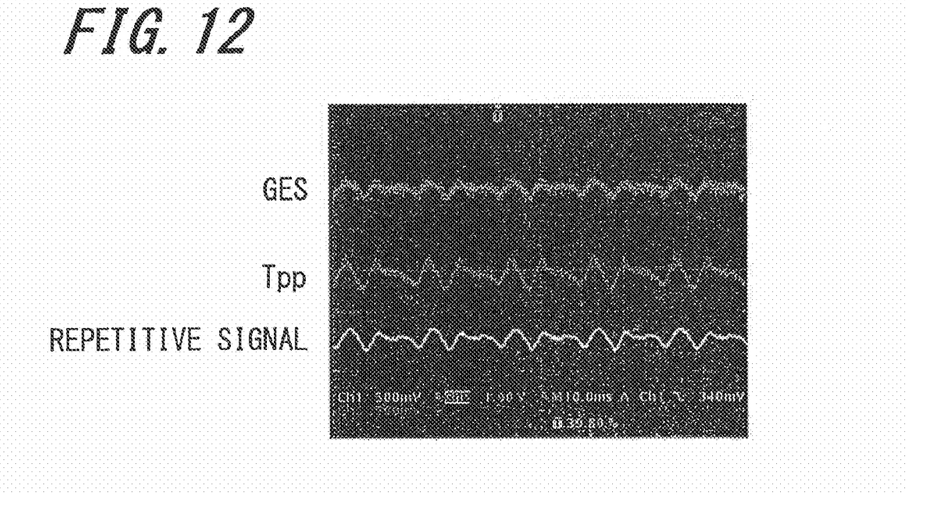
FIG. 12 is a graphic diagram illustrating signal waveforms of GES, Tpp and a repetitive signal of GES.

Furthermore, FIG. 12 illustrates the waveforms of GES, Tpp, and the repetitive component of GES, respectively. FIG. 12 shows that the waveform of the repetitive component of GES is similar to that of Tpp. Therefore, when feed forward is carried out with a Tpp signal, the same compensation as that of the repetitive servo control may be obtained.

Figure 13A:
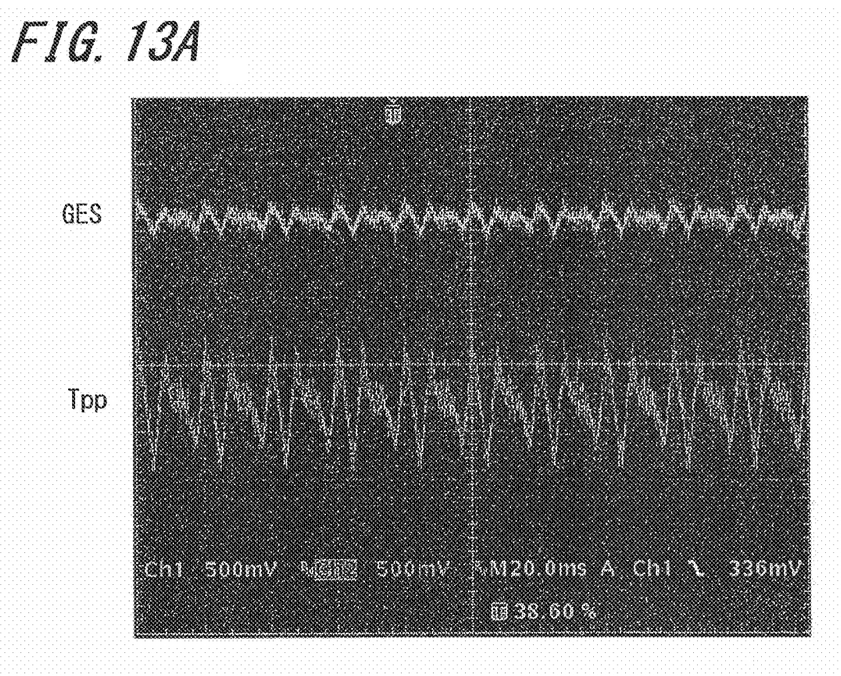
FIG. 13A is a graphic view before feeding forward a push-pull signal and FIG. 13B is a graphic view after feeding forward the push-pull signal.
Figure 13B:
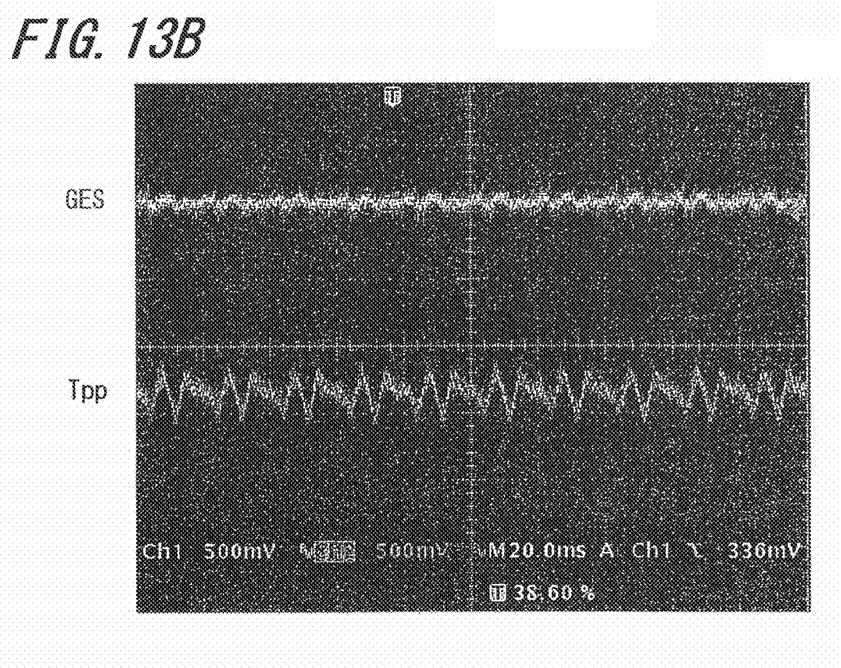

FIGS. 13A and 13B illustrate the results of feed-forward servo control with Tpp. As shown in FIG. 5, the feed forward process includes passing a Tpp signal through the servo filter 80 such as a low-pass filter and then adding the Tpp signal to an error signal e. The results shown in the figures are obtained by a measurement using a disk-shaped optical recording medium rotated at a rotational speed of 3,000 rpm. FIG. 13A illustrates the results obtained before the feed forward and FIG. 13B illustrates the results obtained after the feed forward.

These results show that the tangential push-pull (Tpp) signal, the push-pull signal in a traveling direction of the control target relative to the optical recording medium, prevents the gap-error signal (GES) from repetition. In other words, the gap control can be efficiently carried out even if the rotational speed of the optical recording medium is 3,000 rpm or more, when the feed-forward servo control is carried out using Tpp in this way. Furthermore, the follow-up ability of the gap is improved after carrying out the feed forward. Thus, as shown in FIGS. 13A and 13B, the amplitude has become small after applying Tpp even though the waveform of the Tpp signal is unchanged.

Figure 14:
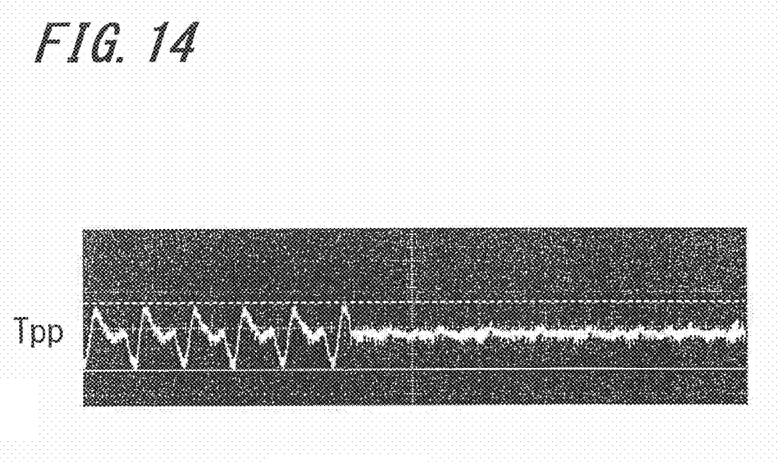
FIG. 14 is a graphic diagram illustrating the waveform of a tangential push-pull signal before and after carrying out tilt servo control.

Subsequently, when the tilt servo control is carried out using the Tpp signal, GES is held constant as described above. The Tpp signal correctly reflects the tilt quantity, so that the tilt servo control can be carried out in a correct manner. FIG. 14 illustrates the tilt servo control. Here, the process of carrying out the tilt servo control using Tpp and Rpp may be, for example, one proposed in Japanese Unexamined Patent Application Publication No. 2006-344351.

As shown in FIG. 14, when the tilt servo mechanism is operated, the tilt error becomes zero and the feed-forward signal represented in FIG. 5 disappears as a matter of cause. Thus, the gap servo control may be fluctuated when the tilt servo mechanism is operated, leading to an incorrect tilt-error signal and an inappropriate operation of the tilt servo mechanism.

Figure 15:
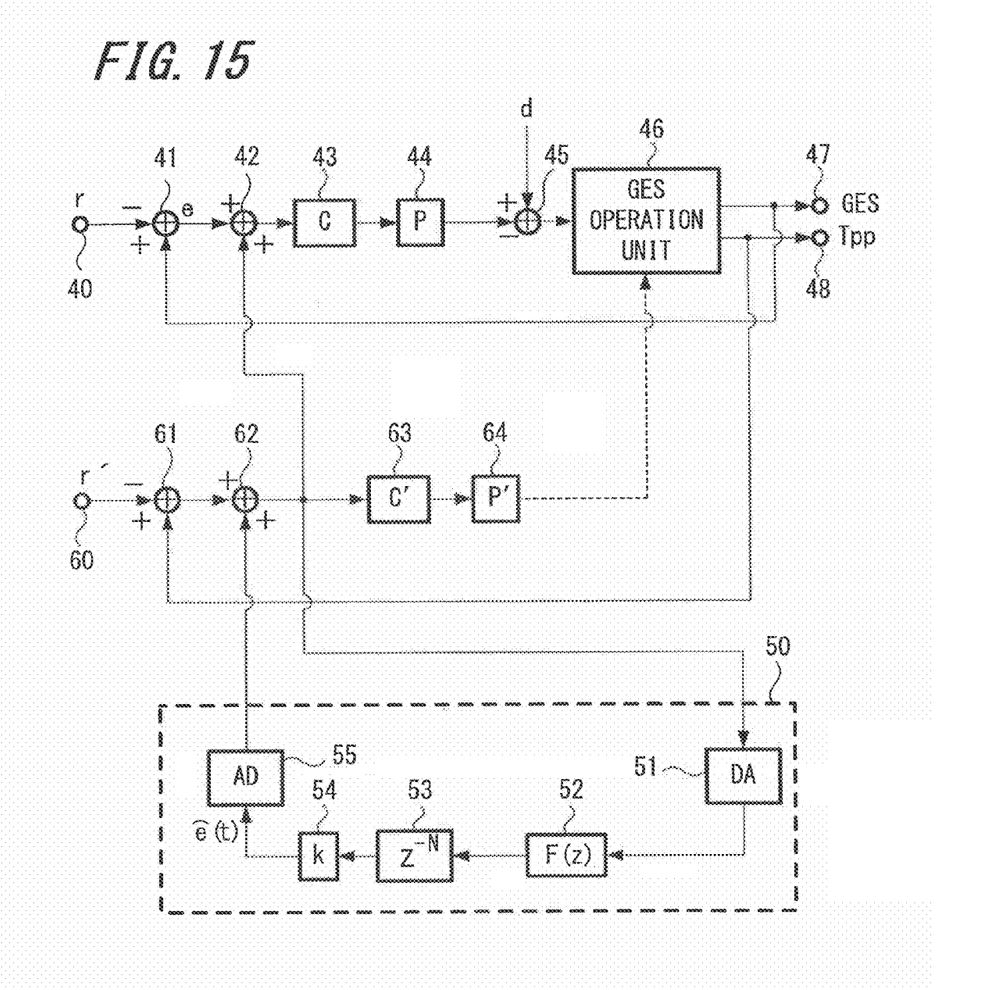
FIG. 15 is a block diagram illustrating an example of a servo loop in a control unit of an optical pickup device in accordance with an embodiment of the present invention.

As shown in FIG. 15, in the tilt servo control in accordance with the embodiment of the present invention, the Tpp signals for one rotation may be previously stored in a memory in a manner similar to the repetitive servo control. A servo loop shown in FIG. 15 includes a subtractor 41, an adder 42, a servo filter 43 in the main loop, a control target 44, an adder 45, a GES operation unit 46, a subtractor 61, an adder 62, a servo filter 63 for tilt control signal, a control target 64, and a repetitive controller 50. The repetitive controller 50 includes a digital-to-analog (D/A) converter 51, a servo filter 52 such as a low-pass filter, a delay line 53 (N denotes the sample number of error signals per rotation), a coefficient multiplier 54, and an analog-to-digital (A/D) converter 55. The memory for one rotation may replace the delay line 53.

As shown in FIG. 15, the control target 64 is connected to the GES operation unit 46 through the dashed line. In actual, even if the tilt servo mechanism is operated, the tilt error may be calculated from the gap error. Thus, in fact, the control target 64 is not connected to the GES operation unit 46.

The desired value r for the gap control input from an input terminal 40 is input into the control target 44 (in this case an actuator in the gap direction of the drive unit 11 shown in FIG. 1) through the subtractor 41, the adder 42, and the servo filter 43. The adder 45 adds disturbance d to an output which varies with the displacement of the control target 44. Then, the GES operation unit 46 detects the total-reflection return-light quantity.

The configuration of the GES operation unit 46 is similar to that of the GES operation unit 76 shown in FIG. 6. In other words, in the case of a disk-shaped optical recording apparatus, GES, Tpp, and Rpp are obtained by operation based on the quantities detected by a detector having four detecting portions divided in the tangential and radial directions.

The obtained Tpp is added to the desired value r' (in this case, zero) of the tangential tilt in the adder 61. Subsequently, the result is input into the adder 42 and the repetitive controller 50 through the adder 62 and also input to the control target 64, an actuator for tilt control.

The Tpp input into the repetitive controller 50 is input into the D/A converter 51 and then input into the delay line 53 through the servo filter 52 such as a low-pass filter. The Tpp is delayed for one rotation in the delay line 53 in the case of, for example, a disk-shaped optical recording medium 20. After obtaining an appropriate gain in the coefficient multiplier 54, the Tpp is input into the adder 62 through the A/D converter 55. The action of the repetitive controller 50 as described above allows a predetermined number of the Tpp signals to be stored. In this case, for example, the number of the Tpp signals corresponds to one rotation. Furthermore, the configuration of the repetitive controller 50 is not limited to one exemplified in FIG. 15 and may be modified variously. For example, instead of the delay line, a memory may be provided as described above.

Specifically, in this example, the feed-forward operation is carried out by the Tpp servo mechanism to stabilize the gap. The Tpp signal is stored for one rotation under such a condition. Subsequently, the tilt servo mechanism is operated. As a result, even if a tilt error becomes zero by the operation of the tilt servo mechanism, the sum of a present signal free of a tilt error obtained after the tilt-servo operation and a signal with a tilt error obtained before the tilt-servo operation is applied as a feed-forward signal. Therefore, it is possible to simultaneously operate the feed-forward servo mechanism and tilt servo mechanism.

Figure 16:
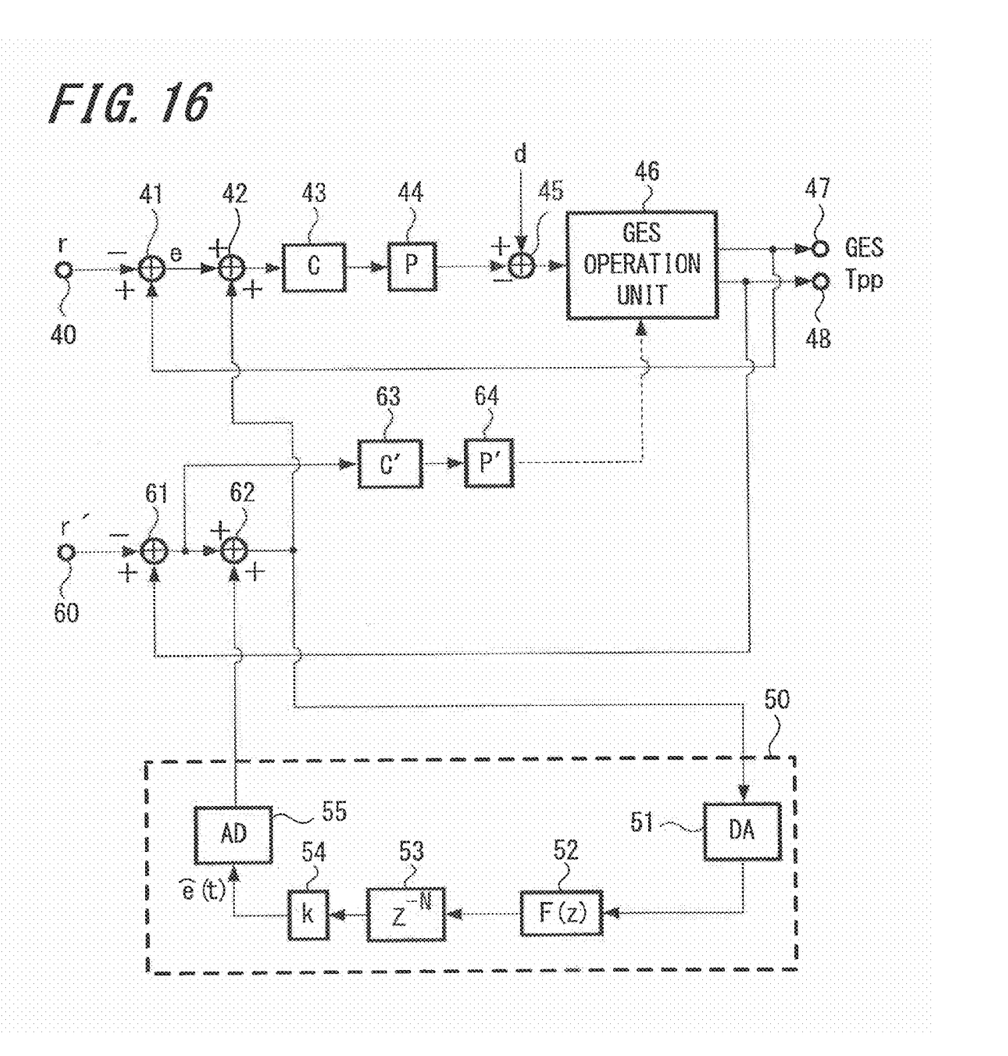
FIG. 16 is a block diagram illustrating another example of a servo loop in a control unit of an optical pickup device in accordance with an embodiment of the present invention.

FIG. 15 shows an example in the case of the feed forward of the tilt control with Tpp. Alternatively, typical feedback may be carried out in the Tpp servo system. FIG. 16 shows an example of a servo loop of the control unit in this case. In FIG. 16, units corresponding to those in FIG. 15 are designated by the same reference numerals to omit redundant description.

In the example illustrated in FIG. 16, Tpp obtained in a GES operation unit 46 is added to the desired value r' and input into a control target 64 through a servo filter 63 directly.

In this case, the feed forward signal for the gap servo control is also the sum of a present signal free of a tilt error obtained after the tilt-servo operation and a signal with a tilt error obtained before the tilt-servo operation. Therefore, it is possible to simultaneously operate the feed-forward servo mechanism and tilt servo mechanism.

As described above, according to the embodiment of the present invention, a gap-error signal is obtained using a feed-forward signal which is a push-pull signal in a traveling direction of a control target relative to an optical recording medium using near-field light or a push-pull signal in a tangential direction in the case of a disk-shaped optical recording medium. Thus, the gap control can be performed with high accuracy even if the rotational speed of the optical recording medium is high (i.e., the speed that the control target moves relative to the optical recording medium increases). Concurrently, the gap control and the tilt control with the push-pull signal can be operated together.

The present invention is not limited to the configuration described in the aforementioned embodiments. The invention may be variously modified and changed without departing from the scope thereof.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup device, comprising:
a light source;
a focusing optical system configured to irradiate an optical recording medium with near-field light;
a light-detecting unit configured to detect a total-reflection return-light quantity from the optical recording medium;
a control unit configured to generate a control signal in response to a detection signal supplied from the light-detecting unit; and
a drive unit configured to drive the focusing optical system to a predetermined position above the optical recording medium, wherein
the control unit feeds forward a push-pull signal in a travelling direction of the drive unit relative to the optical recording medium to a gap-error signal supplied from the light-detecting unit to generate a gap-servo signal, and
the control unit includes a repetitive controller storing a predetermined number of the push-pull signals.

2. The optical pickup device according to claim 1, wherein the focusing optical system includes an optical lens and a solid immersion lens.

3. The optical pickup device according to claim 1, wherein the optical recording medium is a disk-shaped optical recording medium, and
the push-pull signals stored in the repetitive controller are signals for one rotation of the disk-shaped optical recording medium.

4. The optical pickup device according to claim 3, wherein the push-pull signals in a tangential direction perpendicular to a radial direction of the disk-shaped optical recording medium are stored in the repetitive controller.

5. The optical pickup device according to claim 3, wherein the disk-shaped optical recording medium is rotated at a rotational speed of 3,000 rpm or more when recording and/or reproducing data thereon.

6. An optical recording/reproducing apparatus, comprising:
an optical pickup device including a light source, a focusing optical system configured to irradiate an optical recording medium with near-field light, a light-detecting unit configured to detect a total-reflection return-light quantity from the optical recording medium, a control unit configured to generate a control signal in response to a detection signal supplied from the light-detecting unit, and a first drive unit configured to drive the focusing optical system to a predetermined position above the optical recording medium;
a mounting unit on which the optical recording medium is attached; and
a second drive unit configured to move the mounting unit relative to the focusing optical system, wherein
the control unit feeds forward a push-pull signal in a travelling direction of the first drive unit relative to the optical recording medium to a gap-error signal supplied from the light-detecting unit to generate a gap-servo signal; and
the control unit includes a repetitive controller storing a predetermined number of the push-pull signals.

7. The optical recording/reproducing apparatus according to claim 6, wherein
the focusing optical system includes an optical lens and a solid immersion lens.

8. The optical recording/reproducing apparatus according to claim 6, wherein
the optical recording medium is a disk-shaped optical recording medium; and
the push-pull signals stored in the repetitive controller are signals for one rotation of the disk-shaped optical recording medium.

9. A gap-control method comprising the steps of:
detecting a total-reflection return-light quantity between an optical lens and an optical recording medium to obtain a gap-error signal;
feeding forward a push-pull signal of the total-reflection return-light quantity in a traveling direction of the lens relative to the optical recording medium to the gap-error signal to obtain a gap-servo signal;
carrying out gap servo control using the gap-servo signal;
storing a predetermined number of the push-pull signals; and
carrying out tilt servo control after storing the push-pull signals.

* * * * *